US012563261B2

(12) United States Patent
Huang et al.

(10) Patent No.: US 12,563,261 B2
(45) Date of Patent: Feb. 24, 2026

(54) VIDEO PRELOADING METHOD AND APPARATUS, DEVICE AND MEDIUM

(71) Applicant: Beijing Zitiao Network Technology Co., Ltd., Beijing (CN)

(72) Inventors: Shenglan Huang, Culver City, CA (US); Haiqing Tao, Beijing (CN); Hui Wang, Beijing (CN); Chao Ma, Beijing (CN); Bing Yan, Beijing (CN); Xiaocheng Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 134 days.

(21) Appl. No.: 18/546,027

(22) PCT Filed: Jan. 30, 2022

(86) PCT No.: PCT/CN2022/075151
§ 371 (c)(1),
(2) Date: Aug. 10, 2023

(87) PCT Pub. No.: WO2022/171039
PCT Pub. Date: Aug. 18, 2022

(65) Prior Publication Data
US 2024/0114201 A1 Apr. 4, 2024

(30) Foreign Application Priority Data
Feb. 10, 2021 (CN) .......................... 202110185095.9

(51) Int. Cl.
*H04N 21/44* (2011.01)
*H04N 21/442* (2011.01)
(52) U.S. Cl.
CPC . *H04N 21/44004* (2013.01); *H04N 21/44209* (2013.01)

(58) Field of Classification Search
CPC ....... H04N 21/44004; H04N 21/44209; H04N 21/432; H04N 21/472; H04N 21/8456; H04N 21/47202
See application file for complete search history.

(56) References Cited

U.S. PATENT DOCUMENTS 5,874,986 A * 2/1999 Gibbon .......... H04N 21/234381
370/335
8,817,109 B1 8/2014 Biagiotti et al.
(Continued)

FOREIGN PATENT DOCUMENTS

CN 105338409 A 2/2016
CN 106937163 A 7/2017
(Continued)

OTHER PUBLICATIONS

Written Opinion for International Application No. PCT/CN2022/075151, mailed Apr. 27, 2022, 07 Pages.
(Continued)

*Primary Examiner* — Shahan Ur Rahaman

(57) ABSTRACT

Provided are a video preloading method and apparatus, a device, and a medium. The method includes: in response to determining that a length of a buffered video reaches a first numerical value, creating and executing a preloading task, where the buffered video is a current video that is buffered and is to be played, and the preloading task is used for preloading a subsequent video; and in an execution process of the preloading task, in response to determining that the length of the buffered video is less than or equal to a second numerical value, cancelling the preloading task, where the second numerical value is less than the first numerical value.

18 Claims, 5 Drawing Sheets

(56)                    References Cited

U.S. PATENT DOCUMENTS

| | | | |
|---|---|---|---|
| 10,610,780 B1 | 4/2020 | Casey et al. | |
| 2011/0296047 A1* | 12/2011 | Orr | G11B 20/10527 |
| | | | 709/231 |
| 2013/0336638 A1* | 12/2013 | Fork | H04N 5/765 |
| | | | 386/278 |
| 2018/0213268 A1 | 7/2018 | Yan et al. | |
| 2021/0250644 A1* | 8/2021 | Zhou | H04N 21/6582 |
| 2021/0272598 A1* | 9/2021 | Zhang | H04N 5/76 |

FOREIGN PATENT DOCUMENTS

| | | | |
|---|---|---|---|
| CN | 107613404 A | | 1/2018 |
| CN | 108260014 A | | 7/2018 |
| CN | 109688473 A | | 4/2019 |
| CN | 110611829 A | | 12/2019 |
| CN | 110807128 A | | 2/2020 |
| CN | 111107438 A | | 5/2020 |
| CN | 112333476 A | * | 2/2021 |
| WO | 2011004219 A1 | | 1/2011 |
| WO | 2015071464 A1 | | 5/2015 |
| WO | 2017129096 A1 | | 8/2017 |

OTHER PUBLICATIONS

International Search Report issued Apr. 27, 2022 for International Application No. PCT/CN2022/075151, with English translation (4 pages).
Office Action issued Dec. 5, 2022 in Chinese Application No. 202110185095.9, with English translation (11 pages).

* cited by examiner

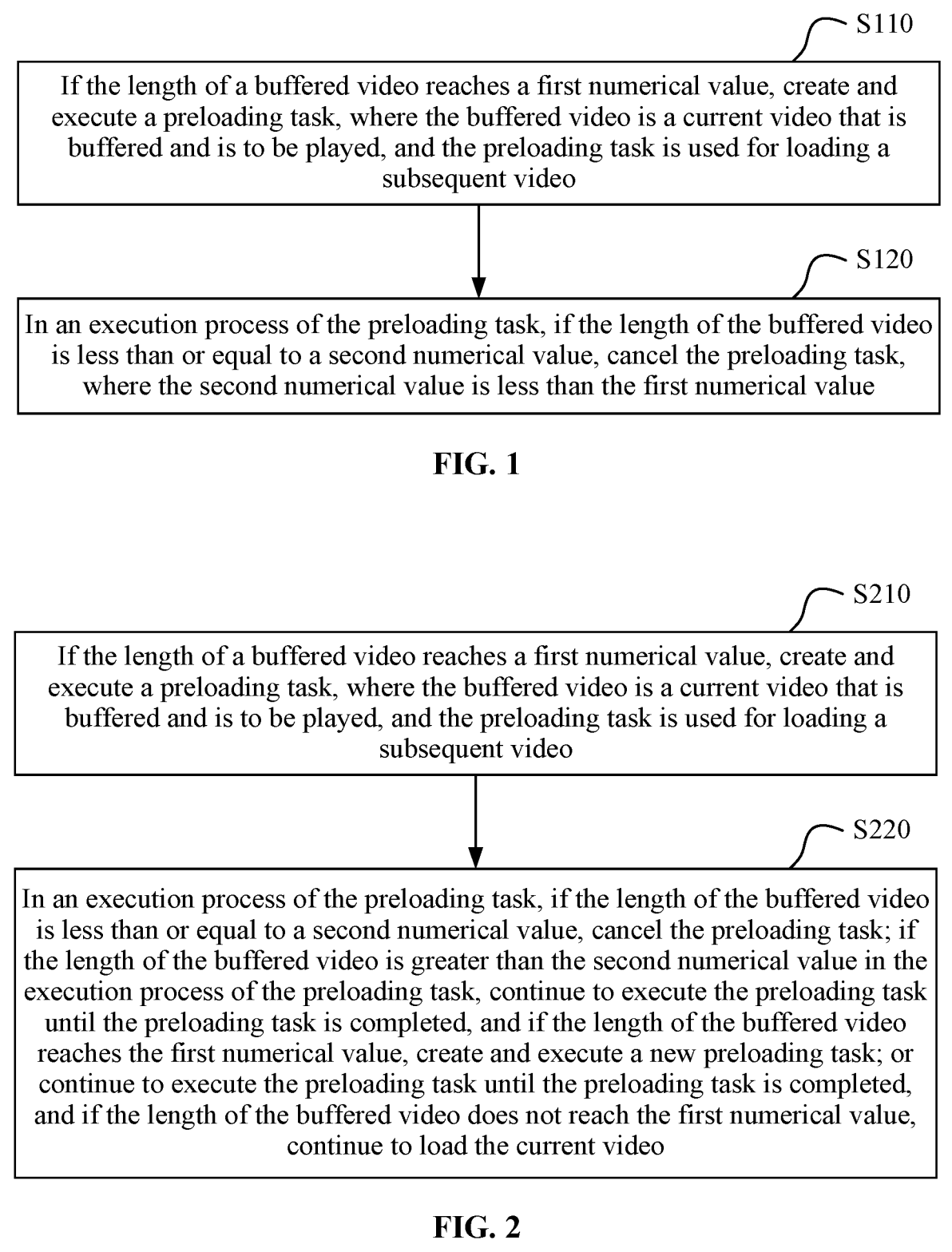

S110

If the length of a buffered video reaches a first numerical value, create and execute a preloading task, where the buffered video is a current video that is buffered and is to be played, and the preloading task is used for loading a subsequent video

S120

In an execution process of the preloading task, if the length of the buffered video is less than or equal to a second numerical value, cancel the preloading task, where the second numerical value is less than the first numerical value

If the length of a buffered video reaches a first numerical value, create and execute a preloading task, where the buffered video is a current video that is buffered and is to be played, and the preloading task is used for loading a subsequent video

S220

In an execution process of the preloading task, if the length of the buffered video is less than or equal to a second numerical value, cancel the preloading task; if the length of the buffered video is greater than the second numerical value in the execution process of the preloading task, continue to execute the preloading task until the preloading task is completed, and if the length of the buffered video reaches the first numerical value, create and execute a new preloading task; or continue to execute the preloading task until the preloading task is completed, and if the length of the buffered video does not reach the first numerical value, continue to load the current video

FIG. 2

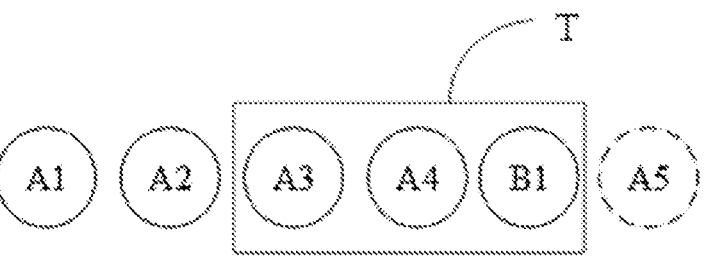

FIG. 4c

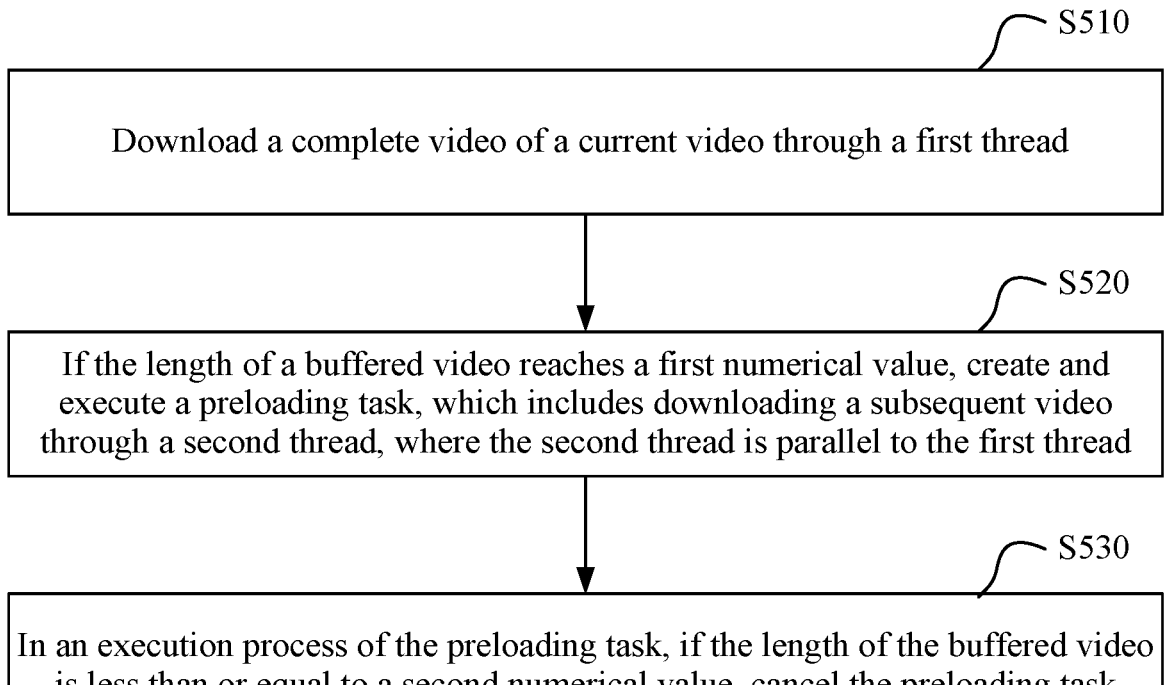

S510

Download a complete video of a current video through a first thread

S520

If the length of a buffered video reaches a first numerical value, create and execute a preloading task, which includes downloading a subsequent video through a second thread, where the second thread is parallel to the first thread

S530

In an execution process of the preloading task, if the length of the buffered video is less than or equal to a second numerical value, cancel the preloading task

FIG. 5

VIDEO PRELOADING METHOD AND APPARATUS, DEVICE AND MEDIUM

This is a U.S. National Stage Application, filed under 35 U.S.C. 371, of International Patent Application No. PCT/CN2022/075151, filed on Jan. 30, 2022, which claims priority to Chinese Patent Application No. 202110185095.9 filed with the China National Intellectual Property Administration (CNIPA) on Feb. 10, 2021, the disclosures of which are incorporated herein by reference in their entireties.

TECHNICAL FIELD

Embodiments of the present disclosure relate to video processing technology, for example, a video preloading method and apparatus, a device, and a medium.

BACKGROUND

In a recommendation-based short video playback scenario, users explore their favorite videos by continuously scrolling down, and a video on a current page is played directly (without a click). As short videos usually last only a dozen seconds, and the users watch the short videos with high exploratory and random tendencies, smooth playback of the short videos is required, and thus the start-up delay of the short videos should be minimized as much as possible. The start-up delay refers to a delay between when a short video is requested from a client and when the client starts to play the short video. For this purpose, in addition to downloading a current video, a client player may load a subsequent video in advance, where loading the subsequent video in advance is called video preloading.

With an increasing number of users watching short videos, the users desire to watch more diversified content, and thus long videos are gradually mixed into the recommendation-based short video playback scenario. However, in the process of the users exploring their favorite videos by continuously scrolling down, their viewing behavior remains exploratory and random. When the users see videos they dislike, they quickly scroll away the videos. The time for which a user stays on a video does not proportionally increase with the length of the video. In the case where the current video is rather long, it is likely that before the player finishes downloading the current video, the user has already scrolled to the subsequent video, and generally the subsequent video still waits to be preloaded. With an unstable network, the start-up delay of the subsequent video easily occurs.

SUMMARY

Embodiments of the present disclosure provide a video preloading method and apparatus, a device, and a medium so as to ensure smooth playback of videos.

Embodiments of the present disclosure provide a video preloading method. The method includes the steps below.

In response to determining that the length of a buffered video reaches a first numerical value, a preloading task is created and executed, where the buffered video is a current video that is buffered and is to be played, and the preloading task is used for loading a subsequent video.

In an execution process of the preloading task, in response to determining that the length of the buffered video is less than or equal to a second numerical value, the preloading task is cancelled, where the second numerical value is less than the first numerical value.

Embodiments of the present disclosure provide a video preloading apparatus. The apparatus includes a buffer module and a preloading module.

The buffer module is configured to store a buffered video, where the buffered video is a current video that is buffered and is to be played.

The preloading module is configured to, in response to determining that the length of the buffered video reaches a first numerical value, create a preloading task and execute the preloading task for loading a subsequent video; and in an execution process of the preloading task, in response to determining that the length of the buffered video is less than or equal to a second numerical value, cancel the preloading task, where the second numerical value is less than the first numerical value.

Embodiments of the present disclosure provide an electronic device. The electronic device includes one or more processors and a memory.

The memory is configured to store one or more programs.

The one or more programs, when executed by the one or more processors, cause the one or more processors to perform the video preloading method according to the embodiment of the present disclosure.

Embodiments of the present disclosure provide a computer-readable storage medium configured to store a computer program which, when executed by a processor, causes the processor to perform the video preloading method according to the embodiment of the present disclosure.

BRIEF DESCRIPTION OF DRAWINGS

Same or similar reference numerals throughout the drawings denote same or similar elements. It is to be understood that the drawings are illustrative and that originals and elements are not necessarily drawn to scale.

FIG. 1 is a flowchart of a video preloading method according to an embodiment of the present disclosure.

FIG. 2 is a flowchart of a video preloading method according to another embodiment of the present disclosure.

FIG. 4C is another schematic diagram of a sliding window in a video preloading method according to another embodiment of the present disclosure.

FIG. 5 is a flowchart of a video preloading method according to another embodiment of the present disclosure.

DETAILED DESCRIPTION

Figure 3:
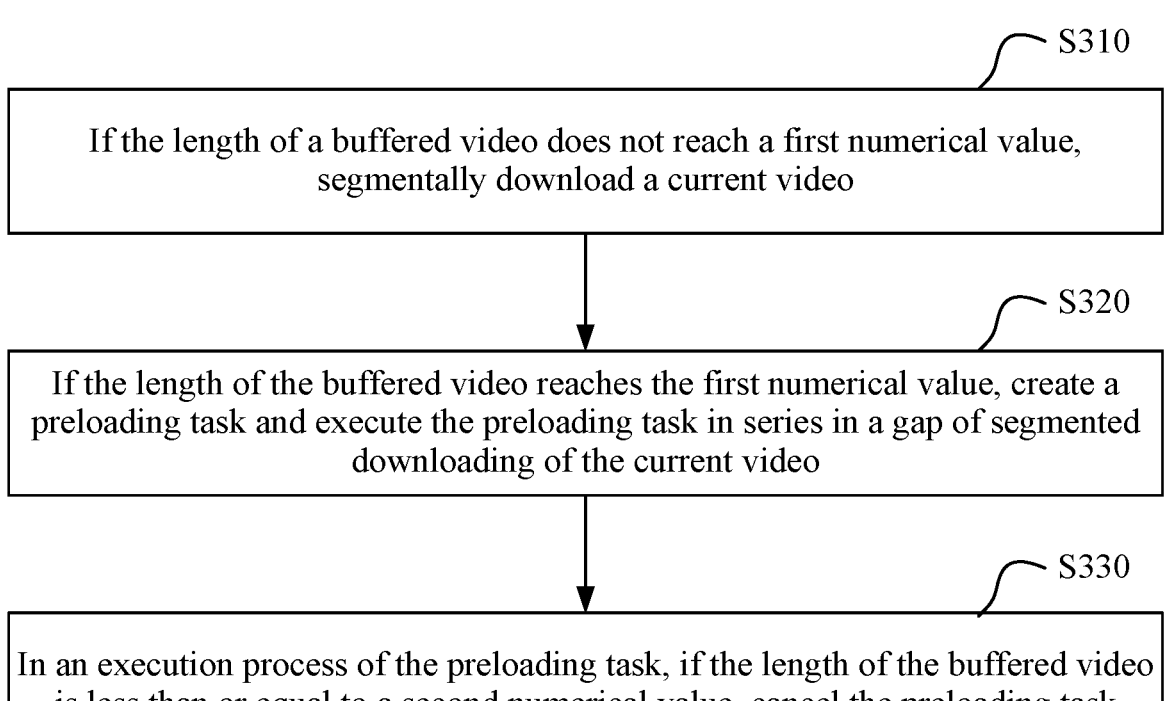
FIG. 3 is a flowchart of a video preloading method according to another embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein. These embodiments are provided so that the present disclosure is thoroughly and completely understood. It is to be understood that the drawings and embodiments of the present disclosure are illustrative and are not intended to limit the scope of the present disclosure.

It is to be understood that steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one another embodiment". The term "some embodiments" refers to "at least some embodiments". Definitions of other terms are given in the description hereinafter.

It is to be noted that concepts such as "first" and "second" in the present disclosure are used to distinguish between apparatuses, between modules, or between units and are not intended to limit the order or mutual dependence of the functions performed by these apparatuses, modules, or units.

It is to be noted that "one" and "multiple" mentioned in the present disclosure are not limiting but illustrative. Those skilled in the art should understand that "one" and "multiple" are construed as "one or more" unless otherwise specified in the context.

The names of messages or information exchanged between apparatuses in embodiments of the present disclosure are illustrative and are not intended to limit the scope of such messages or information.

FIG. 1 is a flowchart of a video preloading method according to an embodiment of the present disclosure. This method may be performed by a video player, and the video player may be implemented by software and/or hardware. This embodiment includes steps S110 and S120. As shown in FIG. 1, the method includes the steps below.

In S110, if the length of a buffered video reaches a first numerical value, a preloading task is created and executed, where the buffered video is a current video that is buffered and is to be played, and the preloading task is used for loading a subsequent video.

In a recommendation-based short video playback scenario, users explore their favorite videos by continuously scrolling down. In the case where a user scrolls down to a current page, a video on the current page is the current video, and the current video is played directly (without a click). A video on a subsequent page to which the user is to scroll down is the subsequent video. At this time, the player buffers a certain length of the current video, and the current video that is buffered and is to be played is called the buffered video.

If the length of the buffered video reaches the first numerical value, it means that the current video may be played smoothly. In this case, the preloading task is created and executed, which considers both the playback of the current video and the preloading of the subsequent video. Even if the user scrolls away from the current page at any time, a start-up delay of the subsequent video is avoided as much as possible, and the possibility of instant playback of the subsequent video is increased.

In S120, in an execution process of the preloading task, if the length of the buffered video is less than or equal to a second numerical value, the preloading task is cancelled, where the second numerical value is less than the first numerical value.

The length of the buffered video is monitored in real time in the execution process of the preloading task. Once the length of the buffered video is less than or equal to the second numerical value, it indicates that it is difficult to ensure smooth playback of the current video, and then the preloading task is cancelled immediately so that the smooth playback of the current video is prevented from being affected by the preloading of the subsequent video. The current video may be a short video or a long video, and the subsequent video may be a short video or a long video. The length of the short video is about a dozen seconds. The length of the long video is greater than the length of the short video, for example, the length of the long video is 1 minute, or the length of the long video is 3 minutes.

The first numerical value and the second numerical value may be delivered in advance by a server. The first numerical value is configured to avoid stuttering during the playback of the current video, and the second numerical value is configured to ensure the instant playback of the subsequent video (that is, the user does not feel any start-up delay of the subsequent video). Specific values of the first numerical value and the second numerical value may be determined according to network conditions and the sensitivity of the user to playback smoothness. For example, in one implementation, the first numerical value is 10 s and the second numerical value is 7 s. Of course, the first numerical value and the second numerical value may be other values. If the first numerical value is set to a higher value, the risk of stuttering during the playback of the current video is lower, and the possibility of the preloading of the subsequent video is reduced accordingly. If the second numerical value is set to a higher value, the risk of stuttering during the playback of the current video is lower, and the possibility that the subsequent video is preloaded to a video length that can achieve instant playback is reduced accordingly.

The first numerical value and the second numerical value may be delivered in advance by the server, and video information about the current video and the subsequent video and storage addresses of the current video and the subsequent video on a content delivery network (CDN) may also be delivered in advance by the server.

The first numerical value, the second numerical value, the video information about the current video and the subsequent video, and the storage addresses of the current video and the subsequent video on the CDN may be delivered in advance by the server. Additionally, for example, the number of subsequent videos and a size of a video to be loaded in the preloading task may be acquired in advance from the server.

The greater the number of preloaded videos, the more videos may be preloaded, and the greater the possibility of the instant playback of the subsequent videos. Accordingly, if the user does not scroll down to pages where the subsequent videos are, the traffic waste caused by portions of the subsequent videos that are not played and have been preloaded is greater. In one implementation, the number of preloaded videos is 5. After testing, when the number of preloaded videos exceeds 5, the possibility of the instant playback of the preloaded subsequent videos is no longer significantly increased. The main reason is that when the number of preloaded videos is 5, each subsequent video has an opportunity to be preloaded during five videos preceding the video are preloaded, and the possibility of preloading the subsequent video is already very high. In combination with the limitation of network traffic, the number of preloaded videos does not need to exceed 5.

Similar to the principle of the number of preloaded videos, the greater the size of the video to be loaded in the preloading task, the greater the possibility of the instant playback of the subsequent videos without stuttering. Accordingly, if the user does not scroll down to the pages where the subsequent videos are, the traffic waste caused by the portions of the subsequent videos that are not played and have been preloaded is greater. Therefore, the size of the video to be loaded in the preloading task may be determined according to actual network conditions. In one implementation, when the overall network speed is fast, the size of the video to be loaded in the preloading task may be set to be smaller, for example, 800 KB. A smaller size of the video to be loaded in the preloading task may ensure the instant playback of the subsequent videos without stuttering. When the overall network speed is slow, the size of the video to be loaded in the preloading task may be set to be larger, for example, 1200 KB. A larger size of the video to be loaded in the preloading task is needed to ensure the instant playback of the subsequent videos without stuttering.

According to the embodiment of the present disclosure, whether to create the preloading task and execute the preloading task may be determined according to the length of the buffered video so that the loading possibility of the subsequent video is increased on the premise that the smooth playback of the current video is ensured, and the start-up delay of the subsequent video is avoided in the case where the user scrolls away at any time when viewing the current video. In particular, in a playback scenario where long videos and short videos are mixed, both the playback of the current video and the preloading of the subsequent video are considered so that the user is supported in random viewing and smooth playback of a video is ensured, thereby achieving good stability and good user experience. FIG. 2 is a flowchart of a video preloading method according to another embodiment of the present disclosure. This method may be performed by a video player, and the video player may be implemented by software and/or hardware. This embodiment includes steps S210 and S220. As shown in FIG. 2, the method includes the steps below.

In S210, if the length of a buffered video reaches a first numerical value, a preloading task is created and executed, where the buffered video is a current video that is buffered and is to be played, and the preloading task is used for loading a subsequent video.

In S220, in an execution process of the preloading task, if the length of the buffered video is less than or equal to a second numerical value, the preloading task is cancelled; if the length of the buffered video is greater than the second numerical value in the execution process of the preloading task, the preloading task continues to be executed. If the preloading task is completed, and the length of the buffered video reaches the first numerical value, a new preloading task is created and executed; or if the preloading task is completed, and the length of the buffered video does not reach the first numerical value, the current video continues to be loaded.

The length of the buffered video is monitored in real time in the execution process of the preloading task. Once the length of the buffered video is less than or equal to the second numerical value, it indicates that it is difficult to ensure smooth playback of the current video, and then the preloading task is cancelled immediately so that the smooth playback of the current video is prevented from being affected by the preloading of the subsequent video. That the length of the buffered video is greater than the second numerical value includes two cases: the length of the buffered video is less than the first numerical value and greater than the second numerical value, and the length of the buffered video is greater than or equal to the first numerical value. In these two cases, the preloading task continues to be executed until the preloading task is completed. Then, a subsequent operation is determined according to the length of the buffered video.

If the preloading task is completed and the length of the buffered video reaches the first numerical value, the new preloading task is created and executed. In the process of executing the new preloading task, step S220 is repeated. If the preloading task is completed and the length of the buffered video reaches the first numerical value, it means that the current video may be played smoothly again, and then the new preloading task is created and executed. In the process of executing the new preloading task, step S220 is repeated.

That the length of the buffered video does not reach the first numerical value includes two cases: the length of the buffered video is less than the first numerical value and greater than the second numerical value, and the length of the buffered video is less than or equal to the second numerical value. In these two cases, the smooth playback of the current video cannot be completely ensured, and thus the current video continues to be loaded. At this time, no new preloading task is created and executed According to the embodiment of the present disclosure, whether to create the preloading task and execute the preloading task may be determined according to the length of the buffered video, and in the case where the preloading task is completed, if the smooth playback of the current video cannot be ensured, no new preloading task is created and executed temporarily. Therefore, in a scenario where long videos and short videos are mixed, both the playback of the current video and the preloading of the subsequent video are considered, and at the same time, the smooth playback of the current video is ensured preferentially.

Figure 4A:
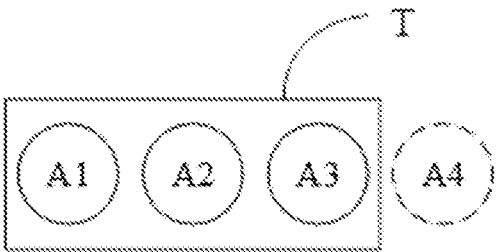
FIG. 4A is a schematic diagram of a sliding window in a video preloading method according to another embodiment of the present disclosure.
Figure 4B:
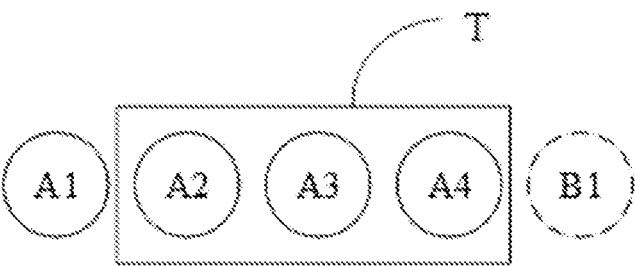
FIG. 4B is another schematic diagram of a sliding window in a video preloading method according to another embodiment of the present disclosure.

FIG. 3 is a flowchart of a video preloading method according to another embodiment of the present disclosure. FIG. 4A is a schematic diagram of a sliding window in a video preloading method according to another embodiment of the present disclosure. FIG. 4B is another schematic diagram of a sliding window in a video preloading method according to another embodiment of the present disclosure. FIG. 4C is another schematic diagram of a sliding window in a video preloading method according to another embodiment of the present disclosure. This method may be performed by a video player, and the video player may be implemented by software and/or hardware. As shown in FIG. 3, the method includes the steps below.

In S310, if the length of a buffered video does not reach a first numerical value, a current video is segmentally downloaded.

In the process of downloading the current video serially, the current video is divided into several sub-videos, and the sub-videos of the current video are segmentally downloaded. A download bandwidth of an undownloaded video is determined according to a bandwidth of a downloaded video in a sliding window so that the download bandwidth is estimated. The downloaded video includes at least one of the current video or a subsequent video, and the undownloaded video includes at least one of the current video or the subsequent video.

In one implementation, a sliding window T is set, and N sub-videos downloaded most recently enter the sliding window T. The current video includes multiple sub-videos A1, A2, A3, A4, A5, . . . , and subsequent videos also include multiple sub-videos B1, B2, B3, . . . C1, C2, C3, . . . . The download bandwidth of the undownloaded video is determined according to the bandwidths of the downloaded videos in the sliding window.

As shown in FIG. 4A, in the case where the length of the buffered video does not reach the first numerical value, sub-videos A1, A2, and A3 in the sliding window T are all sub-videos of the current video. A download bandwidth of an undownloaded video A4 (that is, a sub-video of the current video) is determined according to bandwidths of the sub-videos A1, A2, and A3 in the sliding window T. An average or median of the bandwidths WA1, WA2, and WA3 respectively corresponding to the sub-videos A1, A2, and A3 in the sliding window T may be used as the download bandwidth WA4 of the undownloaded video A4.

In S320, if the length of the buffered video reaches the first numerical value, a preloading task is created, and the preloading task is executed serially in a gap of segmented downloading of the current video.

As shown in FIG. 4B, in the case where the sub-video A4 of the current video is downloaded, and the length of the buffered video is greater than or equal to (reaches) the first numerical value, the risk of stuttering during the playback of the current video is relatively low for the player. To ensure instant playback of the subsequent video (that is, a user does not feel any start-up delay of the subsequent video), the preloading task is created to download a sub-video B1 of the subsequent video, and the preloading task for downloading the sub-video B1 of the subsequent video is executed serially in the gap of the segmented downloading of the current video. The sub-videos A2, A3, and A4 in the sliding window T are sub-videos of the current video. A download bandwidth of the undownloaded video B1 (that is, the sub-video of the subsequent video) is determined according to bandwidths of the sub-videos A2, A3, and A4 in the sliding window T. An average or median of the bandwidths WA2, WA3, and WA4 respectively corresponding to the sub-videos A2, A3, and A4 in the sliding window T may be used as the download bandwidth of the undownloaded video B1.

In S330, in an execution process of the preloading task, if the length of the buffered video is less than or equal to a second numerical value, the preloading task is cancelled, and the current video is reloaded.

As shown in FIG. 4C, in the process of executing the preloading task for downloading the sub-video B1 of the subsequent video, if the length of the buffered video is less than or equal to the second numerical value, that is, the risk of stuttering during the playback of the current video increases, the preloading task is cancelled (not shown in the figure). Otherwise, if the preloading task is completed, and the length of the buffered video reaches the first numerical value, that is, the player may play the current video smoothly again, a new preloading task is created and executed (not shown in the figure). Alternatively, if the preloading task for downloading the sub-video B1 of the subsequent video is completed, and the length of the buffered video does not reach the first numerical value, that is, no stuttering occurs during the playback of the current video but the smooth playback of the current video cannot be ensured completely, no new preloading task is created temporarily; instead, a sub-video A5 of the current video continues to be loaded. The sub-videos A3 and A4 in the sliding window T are sub-videos of the current video, and the sub-video B1 is the sub-video of the subsequent video. A download bandwidth of the undownloaded video A5 is determined according to bandwidths of the sub-videos A3, A4, and B1 in the sliding window T. An average or median of the bandwidths WA3, WA4, and WB1 respectively corresponding to the sub-videos A3, A4, and B1 in the sliding window T may be used as the download bandwidth of the undownloaded video A5.

According to the embodiment of the present disclosure, whether to execute the preloading task serially in the gap of the segmented downloading of the current video may be determined according to the length of the buffered video, and the download bandwidth of the undownloaded video is determined through the sliding window so that network resources are reasonably allocated. The loading possibility of the subsequent video is increased on the premise that the smooth playback of the current video is ensured, and the start-up delay of the subsequent video is avoided in the case where the user scrolls away at any time when viewing the current video. In particular, in a playback scenario where long videos and short videos are mixed, both the playback of the current video and the preloading of the subsequent video are considered so that the user is supported in random viewing and smooth playback of a video is ensured, thereby achieving good stability and good user experience.

Figure 6:
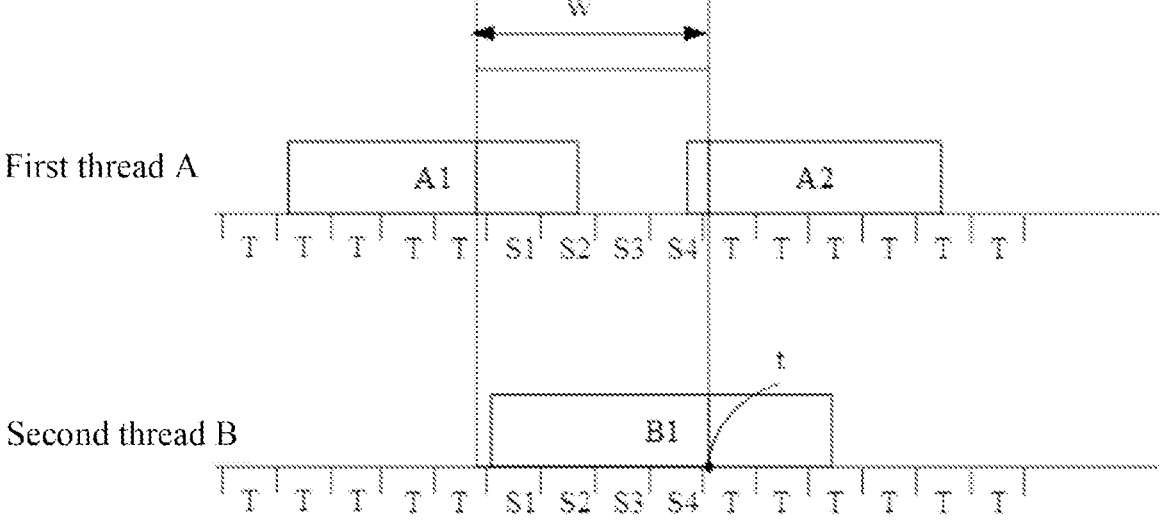
FIG. 6 is a schematic diagram illustrating multi-threaded video downloading in a video preloading method according to another embodiment of the present disclosure.

FIG. 5 is a flowchart of a video preloading method according to another embodiment of the present disclosure. FIG. 6 is a schematic diagram illustrating multi-threaded video downloading in a video preloading method according to another embodiment of the present disclosure. This method may be performed by a video player, and the video player may be implemented by software and/or hardware. As shown in FIG. 5, the method includes the steps below.

In S510, a complete video of a current video is downloaded through a first thread.

In S520, if the length of a buffered video reaches a first numerical value, a preloading task is created and executed, which includes downloading a subsequent video through a second thread, where the second thread is parallel to the first thread.

A download bandwidth of each target sampling period in a time window is determined according to the number of bytes of a video downloaded through each thread in the each target sampling period in the time window. A download bandwidth of each thread at an end time of the time window is estimated according to the download bandwidths of the target sampling periods in the time window. The number of second threads for downloading subsequent videos may be one or more. In one implementation, one second thread is used as an example. The implementation principle of two or more second threads is similar to that of one second thread.

In the case where multi-threaded video downloading is performed, not all threads are used for downloading videos at the same time. As shown in FIG. 6, the current video is downloaded through a first thread A in time slots A1 and A2, and the subsequent video is downloaded through a second thread B in a time slot B1. The number of bytes of a video downloaded through each thread in a sampling period T is recorded. A duration W before a time t at which a download bandwidth of parallel threads needs to be determined is determined to be the time window, and sampling periods in the time window are used as the target sampling periods. In one implementation, target sampling periods are S1, S2, S3, and S4. The number P1 of bytes of a video downloaded through the first thread A in the target sampling period S1 is added to the number Q1 of bytes of a video downloaded through the second thread B in the target sampling period S1 and then divided by a duration M of the target sampling period S1 so that the download bandwidth (P1+Q1)/M of the target sampling period S1 is obtained. The download bandwidth of the parallel (multiple) threads at the time t is estimated according to download bandwidths of the target sampling periods S1, S2, S3, and S4. The download bandwidth of the parallel threads at the time t may be an average of the download bandwidths of the target sampling periods S1, S2, S3, and S4, a maximum number of the download bandwidths of the target sampling periods S1, S2, S3, and S4, or a median of the download bandwidths of the target sampling periods S1, S2, S3, and S4.

When the number of bytes of the video downloaded through each thread in the sampling period T is recorded, a sampling period where the number of bytes is zero is removed because no downloaded video collected does not mean that the bandwidth of the sampling period is zero.

In one implementation, the duration M of the sampling period is 200 ms or 1 s.

In S530, in an execution process of the preloading task, if the length of the buffered video is less than or equal to a second numerical value, the preloading task is cancelled, that is, the second thread is cancelled.

According to the embodiment of the present disclosure, whether to download the subsequent video through the second thread parallel to the first thread for downloading the current video may be determined according to the length of the buffered video, and the download bandwidth of the multiple threads at a specified time is determined through the time window and the sampling period so that network resources are accurately allocated. The loading possibility of the subsequent video is increased on the premise that the smooth playback of the current video is ensured, and the start-up delay of the subsequent video is avoided in the case where a user scrolls away at any time when viewing the current video. In particular, in a playback scenario where long videos and short videos are mixed, both the playback of the current video and the preloading of the subsequent video are considered so that the user is supported in random viewing and smooth playback of a video is ensured, thereby achieving good stability and good user experience.

Figure 7:
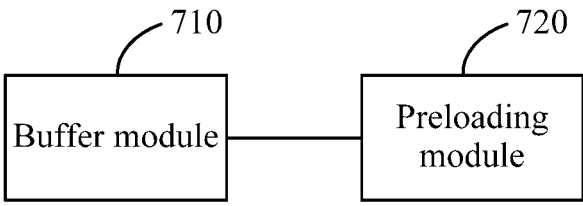
FIG. 7 is a structure diagram of a video preloading apparatus according to an embodiment of the present disclosure.

FIG. 7 is a structure diagram of a video preloading apparatus according to an embodiment of the present disclosure. This apparatus can perform the video preloading method in the preceding embodiments and may be configured in a video player. As shown in FIG. 7, the apparatus may include a buffer module 710 and a preloading module 720.

The buffer module 710 is configured to store a buffered video, where the buffered video is a current video that is buffered and is to be played.

The preloading module 720 is configured to, if the length of the buffered video reaches a first numerical value, create a preloading task and execute the preloading task for loading a subsequent video; and in an execution process of the preloading task, if the length of the buffered video is less than or equal to a second numerical value, cancel the preloading task, where the second numerical value is less than the first numerical value.

According to the embodiment of the present disclosure, whether to create the preloading task and execute the preloading task may be determined according to the length of the buffered video so that the loading possibility of the subsequent videos is increased on the premise that the smooth playback of the current video is ensured, and the start-up delay of the subsequent video is avoided in the case where the user scrolls away at any time when viewing the current video. In particular, in a playback scenario where long videos and short videos are mixed, both the playback of the current video and the preloading of the subsequent videos are considered so that the user is supported in random viewing and smooth playback of a video is ensured, thereby achieving good stability and user experience.

On the basis of the preceding embodiment, the preloading module is also configured to, in the execution process of the preloading task, if the length of the buffered video is greater than the second numerical value, continue to execute the preloading task until the preloading task is completed, and if the length of the buffered video reaches the first numerical value, create a new preloading task and execute the new preloading tasking; or if the preloading task is completed, and the length of the buffered video does not reach the first numerical value, continue to load the current video.

On the basis of the preceding embodiment, the preloading module is configured to execute the preloading task serially in a gap of segmented downloading of the current video.

On the basis of the preceding embodiment, the preloading module is also configured to determine a download bandwidth of an undownloaded video according to a bandwidth of a downloaded video in a sliding window, where the downloaded video includes at least one of the current video or the subsequent video, and the undownloaded video includes at least one of the current video or the subsequent video.

On the basis of the preceding embodiment, the preloading module is also configured to download a complete video of the current video through a first thread and download the subsequent video through a second thread, where the second thread is parallel to the first thread.

On the basis of the preceding embodiment, the preloading module is configured to determine a download bandwidth of each target sampling period in a time window according to the number of bytes of a video downloaded through each thread in the each target sampling period in the time window and estimate a download bandwidth of each thread at an end time of the time window according to download bandwidths of the target sampling periods.

On the basis of the preceding embodiment, the preloading module is configured to divide a sum of the number of bytes of the video downloaded through each thread in the each target sampling period by a duration of the each target sampling period to obtain the download bandwidth of the each target sampling period.

On the basis of the preceding embodiment, the preloading module is configured to use a median of the download bandwidths of the target sampling periods as the download bandwidth of each thread at the end time of the time window.

On the basis of the preceding embodiment, the preloading module is configured to record the number of bytes of a video downloaded through each thread in a sampling period, where the target sampling period is a sampling period in the time window.

On the basis of the preceding embodiment, the number of bytes of the video downloaded through each thread in the sampling period is not zero.

On the basis of the preceding embodiment, a duration of the sampling period is 200 ms or 1 s.

On the basis of the preceding embodiment, the preloading module is also configured to acquire the number of subsequent videos and a size of a video to be loaded in the preloading task.

On the basis of the preceding embodiment, the number of preloaded videos is 5.

On the basis of the preceding embodiment, the first numerical value is 10 s and the second numerical value is 7 s.

The video preloading apparatus provided in the embodiment of the present disclosure belongs to the same inventive concept as the video preloading method provided in the preceding embodiment. For technical details not described in detail in this embodiment, reference can be made to the preceding embodiment, and this embodiment has the same beneficial effects as the video preloading method performed.

Figure 8:
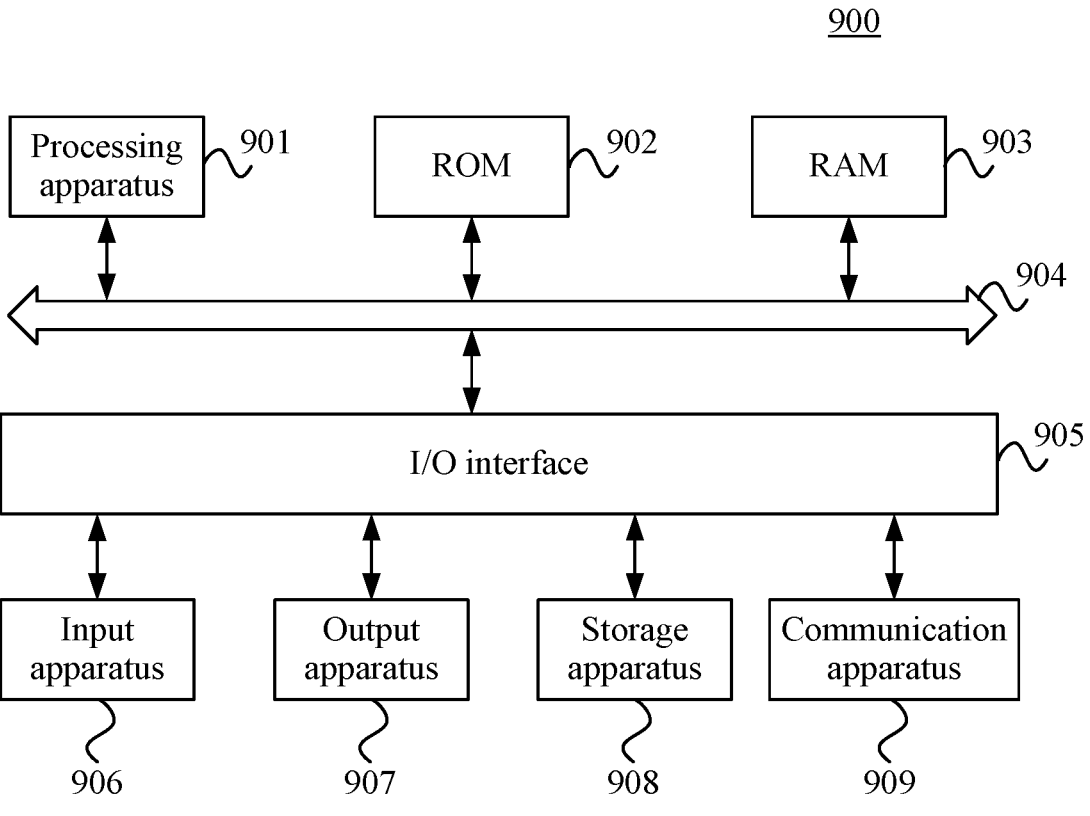
FIG. 8 is a structure diagram of an electronic device according to an embodiment of the present disclosure.

FIG. 8 shows a structure diagram of an electronic device 900 suitable for implementing the embodiment of the present disclosure. The electronic device in the embodiment of the present disclosure has a video transcoding function and may include, but is not limited to, a mobile terminal such as a mobile phone, a laptop, a digital broadcast receiver, a personal digital assistant (PDA), a portable Android device (PAD), a portable media player (PMP), and an in-vehicle terminal (such as an in-vehicle navigation terminal) and a stationary terminal device such as a digital television (TV) and a desktop computer. The electronic device shown in FIG. 8 is merely an example and is not intended to limit the function and use scope of the embodiment of the present disclosure.

As shown in FIG. 8, the electronic device 900 may include a processing apparatus 901 (such as a central processing unit and a graphics processing unit). The processing apparatus 901 may perform various appropriate actions and processing according to a program stored in a read-only memory (ROM) 902 or a program loaded from a storage apparatus 908 into a random-access memory (RAM) 903. The RAM 903 also stores various programs and data required for the operation of the electronic device 900. The processing apparatus 901, the ROM 902, and the RAM 903 are connected to each other through a bus 904. An input/output (I/O) interface 905 is also connected to the bus 904.

Generally, the following apparatuses may be connected to the I/O interface 905: an input apparatus 906 such as a touch screen, a touch pad, a keyboard, a mouse, a camera, a microphone, an accelerometer, and a gyroscope, an output apparatus 907 such as a liquid crystal display (LCD), a speaker, and a vibrator, the storage apparatus 908 such as a magnetic tape and a hard disk, and a communication apparatus 909. The communication apparatus 909 may allow the electronic device 900 to perform wireless or wired communication with other devices so as to exchange data. Although FIG. 8 shows the electronic device 900 having various apparatuses, it is to be understood that not all the apparatuses shown herein need to be implemented or present. Alternatively, more or fewer apparatuses may be implemented or present.

For example, according to the embodiment of the present disclosure, the process described above with reference to the flowcharts may be implemented as a computer software program. For example, a computer program product is included in the embodiment of the present disclosure. The computer program product includes a computer program carried in a non-transitory computer-readable medium. The computer program includes program codes for performing the methods shown in the flowcharts. In such embodiments, the computer program may be downloaded and installed from a network through the communication apparatus 909, installed from the storage apparatus 908, or installed from the ROM 902. When the computer program is executed by the processing apparatus 901, the preceding functions defined in the methods of the embodiments of the present disclosure are performed.

The computer-readable medium described above in the present disclosure may be a computer-readable signal medium or a computer-readable storage medium or any combination thereof. The computer-readable storage medium, for example, may be, but is not limited to, an electrical, magnetic, optical, electromagnetic, infrared, or semiconductor system, apparatus, or device or any combination thereof. Examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any appropriate combination thereof. In the present disclosure, the computer-readable storage medium may be any tangible medium including or storing a program that can be used by or used in conjunction with an instruction execution system, apparatus, or device. In the present disclosure, the computer-readable signal medium may include a data signal propagated on a baseband or as part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable signal medium may send, propagate, or transmit a program used by or in conjunction with an instruction execution system, apparatus, or device. Program codes included on the computer-readable medium may be transmitted via any appropriate medium which includes, but is not limited to, a wire, an optical cable, a radio frequency (RF), or any appropriate combination thereof.

In some embodiments, clients and servers can communicate using any network protocol currently known or developed in the future, such as a Hypertext Transfer Protocol (HTTP), and may be interconnected via any form or medium of digital data communication (such as a communication network). Examples of the communication network include a local area network (LAN), a wide area network (WAN), an inter-network (such as the Internet), and a peer-to-peer network (such as an ad hoc network), and any network currently known or developed in the future.

The preceding computer-readable medium may be included in the electronic device or may exist alone without being assembled into the electronic device.

The preceding computer-readable medium carries one or more programs. When the one or more programs are executed by the electronic device, the one or more programs cause the electronic device to: if the length of a buffered video reaches a first numerical value, create a preloading task and execute the preloading task, where the buffered video is a current video that is buffered and is to be played, and the preloading task is used for loading a subsequent video; and in an execution process of the preloading task, if the length of the buffered video is less than or equal to a second numerical value, cancel the preloading task, where the second numerical value is less than the first numerical value.

Computer program codes for performing operations in the present disclosure may be written in one or more programming languages or a combination thereof. The preceding programming languages include, but are not limited to, an object-oriented programming language such as Java, Smalltalk, and C++ and may also include a conventional procedural programming language such as C or a similar programming language. Program codes may be executed entirely on a user computer, partly on a user computer, as a stand-alone software package, partly on a user computer and partly on a remote computer, or entirely on a remote computer or a server. In the case where the remote computer is involved, the remote computer may be connected to the user computer via any type of network including a LAN or a WAN or may be connected to an external computer (for example, via the Internet provided by an Internet service provider).

The flowcharts and block diagrams among the drawings illustrate the architecture, functionality, and operation of possible implementations of systems, methods, and computer program products according to various embodiments of the present disclosure. In this regard, each block in the flowcharts or block diagrams may represent a module, a program segment, or part of codes that contains one or more executable instructions for implementing specified logical functions. It is to be noted that in some alternative implementations, the functions marked in the blocks may occur in an order different from that marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which performs specified functions or operations or may be implemented by a combination of special-purpose hardware and computer instructions.

The modules involved in embodiments of the present disclosure may be implemented by software or hardware. The name of a module is not intended to limit the module in some circumstance. For example, the buffer module may also be described as "a module configured to store the buffered video".

The functions described above herein may be performed at least partially by one or more hardware logic components. For example, without limitation, example types of hardware logic components that can be used include a field-programmable gate array (FPGA), an application-specific integrated circuit (ASIC), an application-specific standard product (ASSP), a system on a chip (SOC), a complex programmable logic device (CPLD), and the like.

In the context of the present disclosure, a machine-readable medium may be a tangible medium that may include or store a program used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any suitable combination thereof. Examples of the machine-readable storage medium include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof.

According to one or more embodiments of the present disclosure, the present disclosure provides a video preloading method. The method includes the steps below.

If the length of a buffered video reaches a first numerical value, a preloading task is created and executed, where the buffered video is a current video that is buffered and is to be played, and the preloading task is used for loading a subsequent video.

In an execution process of the preloading task, if the length of the buffered video is less than or equal to a second numerical value, the preloading task is cancelled, where the second numerical value is less than the first numerical value.

According to one or more embodiments of the present disclosure, the video preloading method provided by the present disclosure also includes the steps below. If the length of the buffered video is greater than the second numerical value in the execution process of the preloading task, the preloading task continues to be executed, and if the preloading task is completed and the length of the buffered video reaches the first numerical value, a new preloading tasking is created and executed. Alternatively, if the preloading task is completed and the length of the buffered video does not reach the first numerical value, the current video continues to be loaded.

According to one or more embodiments of the present disclosure, in the video preloading method provided by the present disclosure, the step in which the preloading task is executed includes the step below.

The preloading task is executed serially in a gap of segmented downloading of the current video.

According to one or more embodiments of the present disclosure, the video preloading method provided by the present disclosure further includes the step below.

A download bandwidth of an undownloaded video is determined according to a bandwidth of a downloaded video in a sliding window, where each of the downloaded videos includes at least one of the current video or the subsequent video, and the undownloaded video includes at least one of the current video or the subsequent video.

According to one or more embodiments of the present disclosure, in the video preloading method provided by the present disclosure, the step in which the preloading task is executed includes the steps below.

A complete video of the current video is downloaded through a first thread.

The subsequent video is downloaded through a second thread, where the second thread is parallel to the first thread.

According to one or more embodiments of the present disclosure, the video preloading method provided by the present disclosure further includes the steps below.

A download bandwidth of each target sampling period in a time window is determined according to the number of bytes of a video downloaded through each thread in the each target sampling period in the time window.

A download bandwidth of each thread at an end time of the time window is estimated according to download bandwidths of the target sampling periods.

According to one or more embodiments of the present disclosure, in the video preloading method provided by the present disclosure, the step in which the download bandwidth of the each target sampling period in the time window is determined according to the number of bytes of the video downloaded through each thread in the each target sampling period in the time window includes the step below.

A sum of the number of bytes of the video downloaded through each thread in the each target sampling period is divided by a duration of the each target sampling period so that the download bandwidth of the target sampling period is obtained.

According to one or more embodiments of the present disclosure, in the video preloading method provided by the present disclosure, the step in which the download bandwidth of each thread at the end time of the time window is estimated according to the download bandwidths of the target sampling periods includes the step below.

A median of the download bandwidths of the target sampling periods is used as the download bandwidth of each thread at the end time of the time window.

According to one or more embodiments of the present disclosure, in the video preloading method provided by the present disclosure, before the download bandwidth of the each target sampling period in the time window is determined according to the number of bytes of the video downloaded through each thread in the each target sampling period in the time window, the method further includes the step below.

The number of bytes of a video downloaded through each thread in a sampling period is recorded, where the target sampling period is a sampling period in the time window.

According to one or more embodiments of the present disclosure, in the video preloading method provided by the present disclosure, the number of bytes of the video downloaded through each thread in the sampling period is not zero.

According to one or more embodiments of the present disclosure, in the video preloading method provided by the present disclosure, a duration of the sampling period is 200 ms or 1 s.

According to one or more embodiments of the present disclosure, in the video preloading method provided by the present disclosure, before the preloading task is created and executed if the length of the buffered video reaches the first numerical value, the method further includes the step below.

The number of subsequent videos and a size of a video to be loaded in the preloading task are acquired.

According to one or more embodiments of the present disclosure, in the video preloading method provided by the present disclosure, the number of preloaded videos is 5.

According to one or more embodiments of the present disclosure, in the video preloading method provided by the present disclosure, the first numerical value is 10 s and the second numerical value is 7 s.

According to one or more embodiments of the present disclosure, the present disclosure provides a video preloading apparatus. The apparatus includes a buffer module and a preloading module.

The buffer module is configured to store a buffered video, where the buffered video is a current video that is buffered and is to be played.

The preloading module is configured to, if the length of the buffered video reaches a first numerical value, create a preloading task and execute the preloading task for loading a subsequent video; and in an execution process of the preloading task, if the length of the buffered video is less than a second numerical value, cancel the preloading task, where the second numerical value is less than the first numerical value.

According to one or more embodiments of the present disclosure, the present disclosure provides an electronic device. The electronic device includes one or more processors and a memory.

The memory is configured to store one or more programs.

The one or more programs, when executed by the one or more processors, cause the one or more processors to perform the video preloading method according to any embodiment of the present disclosure.

According to one or more embodiments of the present disclosure, the present disclosure provides a computer-readable storage medium configured to store a computer program which, when executed by a processor, causes the processor to perform the video preloading method according to any embodiment of the present disclosure.

The preceding description is merely illustrative of example embodiments of the present disclosure and technical principles used therein. Those skilled in the art should understand that the scope of the present disclosure is not limited to the technical solutions formed by a particular combination of the preceding technical features and should cover other technical solutions formed by any combination of the preceding technical features or their equivalent features without departing from the concept of the present disclosure, for example, technical solutions formed by the substitutions of the preceding technical features with the technical features that are disclosed in the present disclosure and (may not necessarily) have similar functions.

Additionally, although multiple operations are described in a particular order, it is not a must to perform these operations in this particular order or in sequential order. In a certain environment, multitasking and parallel processing may be advantageous. Similarly, although several specific implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable sub-combination.

What is claimed is:

1. A video preloading method, comprising:

in response to determining that a length of a buffered video reaches a first numerical value, creating a preloading task and executing the preloading task, wherein the buffered video is a current video that is buffered and is to be played, and the preloading task is used for loading a subsequent video; and in an execution process of the preloading task, in response to determining that the length of the buffered video is less than or equal to a second numerical value, canceling the preloading task, wherein the second numerical value is less than the first numerical value;

wherein executing the preloading task comprises:

downloading a complete video of the current video through a first thread; and downloading the subsequent video through a second thread, wherein the second thread is parallel to the first thread; and wherein the method further comprises:

determining a download bandwidth of each target sampling period in a time window according to a number of bytes of a video downloaded through each thread in the each target sampling period in the time window; and estimating a download bandwidth of each thread at an end time of the time window according to download bandwidths of target sampling periods in the time window.

2. The method according to claim 1, further comprising:

in response to determining that the length of the buffered video is greater than the second numerical value in the execution process of the preloading task, continuing to execute the preloading task; and in response to determining that the preloading task is completed, and the length of the buffered video reaches the first numerical value, creating a new preloading task and executing the new preloading task; or in response to determining that the preloading task is completed, and the length of the buffered video does not reach the first numerical value, continuing to load the current video.

3. The method according to claim 1, wherein executing the preloading task comprises:

executing the preloading task serially in a gap of segmented downloading of the current video.

4. The method according to claim 3, further comprising:

determining a download bandwidth of an undownloaded video according to a bandwidth of a downloaded video in a sliding window, wherein the downloaded video comprises at least one of the current video or the subsequent video, and the undownloaded video comprises at least one of the current video or the subsequent video.

5. The method according to claim 1, wherein determining the download bandwidth of each target sampling period in the time window according to the number of bytes of the video downloaded through each thread in the each target sampling period in the time window comprises:

dividing a sum of the number of bytes of the video downloaded through each thread in the each target sampling period by a duration of the each target sampling period to obtain the download bandwidth of the each target sampling period.

6. The method according to claim 1, wherein estimating the download bandwidth of each thread at the end time of the time window according to the download bandwidths of the target sampling periods in the time window comprises:

using a median of the download bandwidths of the target sampling periods as the download bandwidth of each thread at the end time of the time window.

7. The method according to claim 1, before determining the download bandwidth of the each target sampling period in the time window according to the number of bytes of the video downloaded through each thread in the each target sampling period in the time window, further comprising:

recording a number of bytes of a video downloaded through each thread in a sampling period, wherein the target sampling period is a sampling period in the time window.

8. The method according to claim 7, wherein the number of bytes of the video downloaded through each thread in the sampling period is not zero.

9. The method according to claim 8, wherein a duration of the sampling period is 200 ms or 1 s.

10. The method according to claim 1, before creating the preloading task and executing the preloading task in response to determining that the length of the buffered video reaches the first numerical value, further comprising:

acquiring a number of subsequent videos and a size of a video to be loaded in the preloading task.

11. The method according to claim 10, wherein the number of subsequent videos is 5.

12. The method according to claim 1, wherein the first numerical value is 10 s and the second numerical value is 7 s.

13. A video preloading apparatus, comprising:

a processor;

a memory, which is configured to store instructions executable by the processor;

wherein the processor is configured to:

in response to determining that a length of a buffered video reaches a first numerical value, create a preloading task and execute the preloading task, wherein the buffered video is a current video that is buffered and is to be played, and the preloading task is used for loading a subsequent video; and in an execution process of the preloading task, in response to determining that the length of the buffered video is less than or equal to a second numerical value, cancel the preloading task, wherein the second numerical value is less than the first numerical value;

wherein execute the preloading task comprises:

download a complete video of the current video through a first thread; and download the subsequent video through a second thread, wherein the second thread is parallel to the first thread; and wherein the processor is further configured to:

determine a download bandwidth of each target sampling period in a time window according to a number of bytes of a video downloaded through each thread in the each target sampling period in the time window; and estimate a download bandwidth of each thread at an end time of the time window according to download bandwidths of target sampling periods in the time window.

14. A non-transitory computer-readable storage medium, which is configured to store a computer program which, when executed by a processor, causes the processor to perform the following steps:

in response to determining that a length of a buffered video reaches a first numerical value, creating a preloading task and executing the preloading task, wherein the buffered video is a current video that is buffered and is to be played, and the preloading task is used for loading a subsequent video; and in an execution process of the preloading task, in response to determining that the length of the buffered video is less than or equal to a second numerical value, canceling the preloading task, wherein the second numerical value is less than the first numerical value;

wherein executing the preloading task comprises:

downloading a complete video of the current video through a first thread; and downloading the subsequent video through a second thread, wherein the second thread is parallel to the first thread; and wherein when executed by a processor, causes the processor to further perform the following steps:

determining a download bandwidth of each target sampling period in a time window according to a number of bytes of a video downloaded through each thread in the each target sampling period in the time window; and estimating a download bandwidth of each thread at an end time of the time window according to download bandwidths of target sampling periods in the time window.

15. The method according to claim 5, wherein estimating the download bandwidth of each thread at the end time of the time window according to the download bandwidth of the target sampling period comprises:

using a median of the download bandwidth of the target sampling period as the download bandwidth of each thread at the end time of the time window.

16. The method according to claim 5, before determining the download bandwidth of the target sampling period according to the number of bytes of the video downloaded through each thread in the target sampling period in the time window, further comprising:

recording a number of bytes of a video downloaded through each thread in a sampling period, wherein the target sampling period is a sampling period in the time window.

17. The apparatus according to claim 13, the processor is further configured to:

in response to determining that the length of the buffered video is greater than the second numerical value in the execution process of the preloading task, continue to execute the preloading task; and in response to determining that the preloading task is completed, and the length of the buffered video reaches the first numerical value, create a new preloading task and execute the new preloading task; or in response to determining that the preloading task is completed, and the length of the buffered video does not reach the first numerical value, continue to load the current video.

18. The apparatus according to claim 13, wherein the processor is configured to execute the preloading task in the following manner:

executing the preloading task serially in a gap of segmented downloading of the current video.

\* \* \* \* \*